United States Patent [19]

Schuller

[11] 4,133,190
[45] Jan. 9, 1979

[54] CARDAN DRIVE SHAFT WITH TELESCOPING SHAFT PARTS

[75] Inventor: Walter Schuller, Mössingen, Germany

[73] Assignee: Firma Eberhard Hoeckle GmbH, Germany

[21] Appl. No.: 806,550

[22] Filed: Jun. 14, 1977

[30] Foreign Application Priority Data

Jul. 20, 1976 [DE] Fed. Rep. of Germany ....... 2632537

[51] Int. Cl.² .................................................. F16D 3/06
[52] U.S. Cl. ........................................ 64/23.7; 64/23; 64/9 A
[58] Field of Search ........................... 64/23, 9 A, 23.7

[56] References Cited

U.S. PATENT DOCUMENTS

| | | | |
|---|---|---|---|
| 2,620,163 | 12/1952 | Stone | 64/23.7 |
| 2,845,782 | 8/1958 | Glover | 64/9 A |
| 2,890,594 | 6/1959 | Galonska | 64/23.7 |
| 2,945,366 | 7/1960 | Sears | 64/23.7 |
| 3,045,457 | 7/1962 | Blanchard | 64/23.7 |
| 3,673,817 | 7/1972 | Doran | 64/23.7 |

FOREIGN PATENT DOCUMENTS 7340694  11/1973  Fed. Rep. of Germany ............ 64/23.7

Primary Examiner—Samuel Scott
Assistant Examiner—R. C. Turner
Attorney, Agent, or Firm—Craig & Antonelli

[57] ABSTRACT

The invention consists in that the guide rolls of a cardan shaft drive with two telescopable shaft parts are held with bias in an inset device which presents a trough-shaped depression for each guide roll, and recesses for the back-running roll bodies, said inset device being held in the external shaft part by projections that are in positive engagement therein.

12 Claims, 4 Drawing Figures

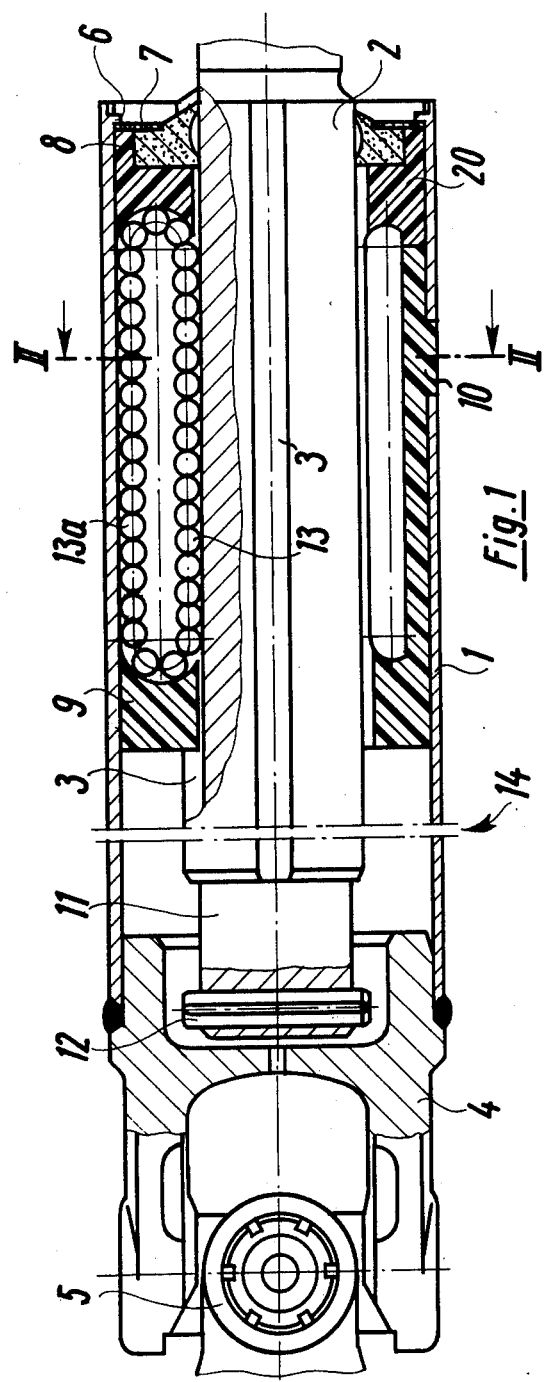
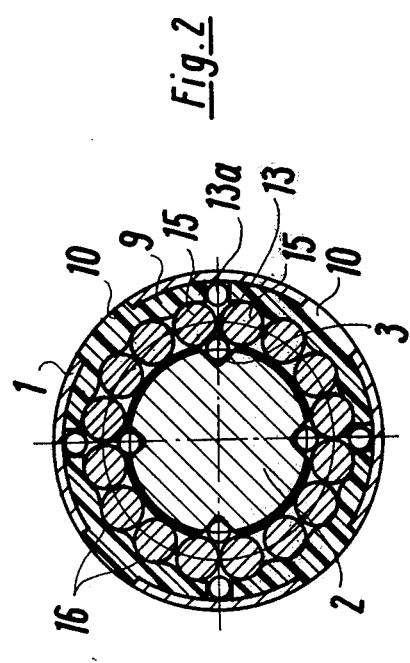
Fig.1
Fig.2

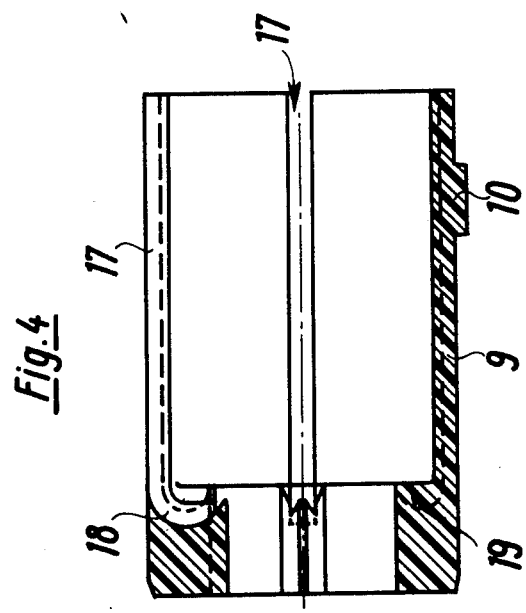
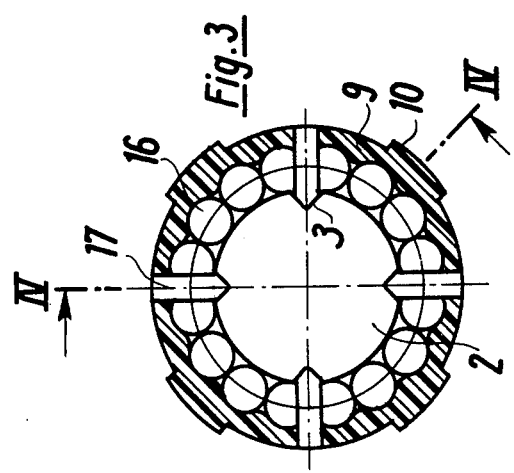

CARDAN DRIVE SHAFT WITH TELESCOPING SHAFT PARTS

The invention relates to a cardan drive shaft with two telescopable shaft parts connected by circulating roll bodies with guide tracks for the roll bodies, so as to be fixed relative to each other in a rotatable manner, whereby the inner guide track for the roll bodies comprises axially running grooves and the external track comprises a ring of guide rolls applied against one another without clearance, on the inner diameter of the outer tubular shaft part, and guide rolls disposed so that they resist torsion, in the outer shaft part.

Cardan shafts of this kind are known. They offer the advantage that they allow a constricted space-saving construction, and make superfluous any expensive shaping of the external body with maintenance of close tolerances. Moreover, it is possible by selection of a lower number of guide rolls to be able to assemble shafts of other diameters.

A certain drawback in known arrangements resides in the circumstance that in the disposition of the inner guide track on the inner shaft part there must be relatively close tolerances to ensure running without clearance, and the return guide grooves are produced with great difficulty and expense on the inner diameter of the outer tube by metal-removing operations. There is the further disadvantage that a separate stop pin has to be adapted, for torque transmission, involving a special work step, and close tolerances have to be kept. If the tolerances are not precisely kept, there is either excessive wear or the parts seize.

The present invention is therefore addressed to the problem of simplification in manufacture, and of offering the possibility of producing the same advantageous effect without the close tolerances.

The invention, in the case of a cardan shaft of the mentioned type, consists in that the guide rolls are held with bias in an inset device which presents a trough-shaped depression for each guide roll, and recesses for the back-running roll bodies, said inset device being held in the external shaft part by projections that are in positive engagement therein. By the arrangement of a separate inset device that is separately machined, it is possible to do without the quite expensive internal machining of the external shaft part. Thereby it is possible to allow the recesses for the back-running roll bodies to assume the form of axial slits, so that the inset device may have a certain elasticity supplementing its intrinsic elasticity, making it possible to impart to the ring of guide rolls the necessary bias without having to keep to such close tolerances for running without play, as in the case of known constructions. It is even possible to arrange the axial slits continuously up to one face of the inset device, to make the inset device bipartite, and to provide an axial stop at one end of the depressions for the guide rolls so that if the inset device is made of plastic for example, a manufacturing process without material removal will be possible, and the desired bias effect will be produced. It is also possible to cast the inset device of aluminum, for instance, whereby both plastic insets or aluminum insets can be either injected directly into the outer shaft part or thrust in after their separate manufacture. The projections on the outer diameter of the inset, which snap into These and further objects, features and advantages of the present invention will become more obvious from the following description when taken in connection with the accompanying drawings which show, for purposes of illustration only, a single embodiment in accordance with the present invention.

FIG. 1 shows a schematic shortened longitudinal section through a cardan drive shaft.

FIG. 2 shows a section through the shaft of FIG. 1, in the direction of plane II—II.

FIG. 3 shows a section similar to FIG. 2, but exclusively through the inset device of the shaft, and FIG. 4 shows the section through the inset device of FIG. 3, along line IV—IV.

From the drawings, it may be seen that the shaft comprises an external tubular shaft part 1 and an internal shaft part 2 which can be thrust axially thereinto, said part 2 having on its periphery four uniformly distributed longitudinal grooves 3 which have an outward cross section that is open by about 90°, produced by drawing. External shaft part 1 is fixedly joined at its left end with an articulating piece 4 on which in turn there is articulated another connecting piece that is not shown in detail. At its right end, shaft part 1 has a closure edge 6 behind which a retaining disk 7 engages, holding a packing ring 8. Bordering on the packing ring and also held by disk 7 there is an inset device 9, made of plastic, which is axially secured by projections 10 in shaft part 1, said projections being distributed uniformly about the periphery on shaft part 1, in the region of the section plane II—II. The inner shaft part 2 has at its left end a shoulder 11 of smaller diameter and a lock pin 12, to prevent unintentional complete withdrawal of shaft part 2 from inset device 9 and from external shaft part 1.

The connection between outer shaft part 1 and inner shaft part 2, so as to be fixed relative to each other in a rotatable manner, is effected by circulating roll bodies 13 that are guided on the one hand in inset device 9 and on the other hand inside grooves 3, which pass over the entire length of shaft part 2 on its periphery. Shaft part 2 is shown, shortened, in FIG. 1, as well as shaft part 1. The lines of separation are indicated at 14.

As FIGS. 2 to 4 show in more detail, roll bodies 13 run on the one hand in guide grooves 3 on the inner shaft part, and on the other hand in the nip between each two guide rolls 15, whereof sixteen are disposed in regular distribution on the inner periphery of inset device 9. These guide rolls 15 have about the same length as inset device 9 and are bedded respectively in recesses 16 on the inside of inset device 9. Since inset device 9 is made of plastic, guide rolls 15 are pressed inward in this way with bias and thus are applied against each other without clearance. The back-running train of roll bodies 13 — indicated by 13a — runs back in longitudinal slits 17 of inset device 9 and thus reaches the inner wall of outer shaft part 1. By the arrangement of slits 17 which according to FIGS. 3 and 4 pass through almost the whole length of inset device 9, said device 9 is radially and elastically spreadable, and even if it is not made of a special plastic it can be radially compressed with relative ease. It is therefore possible to introduce it by its front end 18 into shaft part 1 so that projections 10 will first be pressed inward and then engage with bias in the corresponding recesses on shaft part 1. After introduction of guide rolls 15, roll bodies 13 can be introduced, together with the inner shaft part.

At the left end of inset device 9 as shown in FIGS. 1 and 4, next to the deflecting track 18 for the roll bodies, there is a stop collar 19 that serves to secure the axial position of guide rolls 15 in the inset device. A closure part 20 is set on the inset part from the right and effects closure toward the right, and is in turn held by disk 7.

The arrangement offers the great advantage that the inset device can be cast or injection molded, and it is no longer necessary to use expensive material-removing operations. It is also possible in manufacture of grooves 3 to keep lower tolerances because the running of roll bodies 13 without clearance on the flanks of guide rolls 15 is always ensured by the biased disposition of the said guide rolls. Also, the arrangement of stop or reverse guide tracks in the external shaft part is eliminated so that, as FIG. 1 shows, it can be made as a simple tube. Since the invention likewise makes manufacture of the inner shaft part substantially simpler, it offers an essentially simpler and hence less costly way of manufacture for such cardan drive shafts.

It is also possible to make inset device 9 of aluminum or other nonferrous metal instead of plastic. Even here, the elasticity produced by the construction imparts bias to guide rolls 15 so that the previously mentioned advantageous are obtained. Inset device 9 finally may be multipartite, e.g. made of individual segments which also may be inserted in tubular shaft part 1. The arrangement of special packing and stripper rings as at 8 offers no difficulty, and guide inset 9 is not bound to any plane surface of shoulder, for axial fixation in tubular shaft part 1. The quadruple arrangement of rolls 13 selected for the example offers the additional advantage that there is an exact opposed bracing of the individual guide tracks, which allows precisely determinable bias in the guides without danger of clamping or play on the other tracks. To keep a quadruple division, the number of guide rolls 15 must be directly proportional. It would of course be conceivable, to use uneven numbers of guide rolls, if the roll tracks are suitably selected.

The new arrangement according to the present invention offers the advantage that the disposition of guide rolls 15 so as to be resistant to twisting in inset device 9 and in shaft part 1 is achieved by depressions 16 that can be manufactured without cutting operations, and also the projections 10, which can be produced without cutting, makes separate enclosure and working in of adapter pins superfluous.

While I have shown and described one embodiment in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims.

I claim:

1. A cardan drive shaft with two telescoping shaft parts joined so as to be fixed relative to each other in rotation, by circulating roll bodies with guide tracks for the roll bodies, an inner guide track comprising axially running guide grooves, an intermediate ring of guide rolls applied against each other without clearance, said guide rolls being disposed in the outer shaft part so as to be fixed against twisting, and held with bias in an inset device which presents a troughlike depression for each guide roll and recesses for the back-running roll bodies and which is held in the outer shaft part by projections that positively engage therein.

2. Cardan drive shaft according to claim 1, characterized in that the recesses for the back-running roll bodies are in the form of axial slits.

3. Cardan drive shaft according to claim 2, characterized in that the axial slits pass through to one face of the inset device.

4. Cardan drive shaft according to claim 2, characterized in that the inset device is multipartite having a first part in which said slits are formed, and a closure part, at a front face of the first part, into which the slits open.

5. Cardan drive shaft according to claim 1, characterized in that the depressions for the guide rolls present an axial stop at one end.

6. Cardan drive shaft according to claim 5, characterized in that the axial stop is made as a collar.

7. Cardan drive shaft according to claim 1, characterized in that the inset device is made of elastically deformable plastic.

8. Cardan drive shaft according to claim 1, characterized in that the inset device is made of aluminum.

9. A cardan drive having inner and outer telescoping shaft parts, connected so as to be jointly rotatable, by roll bodies which circulate within a plurality of track means, each said track means having inner and outer paths, said inner path being defined between said inner shaft part and an intermediate ring of guide rolls, said outer path being defined between said guide rolls and said outershaft part, and inset means between said outer part and said guide rolls for biasing said guide rolls against each other without clearance.

10. The cardan drive according to claim 9, wherein said inset means is provided with troughlike depressions within which said guide rolls are received.

11. The cardan drive according to claim 10, wherein said inset means is formed of elastically deformable material and has slits forming portions of said outer paths.

12. Cardan drive shaft according to claim 1, characterized in that the inset device is made of a nonferrous metal.

* * * * *